Oct. 31, 1944.   R. A. CROMWELL   2,361,820
SKI CUTTING MACHINE
Filed Aug. 3, 1940   8 Sheets-Sheet 1

Fig. 1.

Inventor,
Richard Andrew Cromwell
By J. T. Hutchinson Jr.
Atty.

Oct. 31, 1944.　　R. A. CROMWELL　　2,361,820
SKI CUTTING MACHINE
Filed Aug. 3, 1940　　8 Sheets-Sheet 4

Oct. 31, 1944.  R. A. CROMWELL  2,361,820
SKI CUTTING MACHINE
Filed Aug. 3, 1940  8 Sheets-Sheet 5

Oct. 31, 1944. R. A. CROMWELL 2,361,820
SKI CUTTING MACHINE
Filed Aug. 3, 1940 8 Sheets-Sheet 7

Patented Oct. 31, 1944

2,361,820

UNITED STATES PATENT OFFICE 2,361,820

SKI CUTTING MACHINE

Richard Andrew Cromwell,
North Charlestown, N. H.

Application August 3, 1940, Serial No. 350,790

14 Claims. (Cl. 144—144)

This invention relates to woodworking machines and more particularly to woodworking machines capable of automatically, completely, and continuously shaping wood into articles such as skis, having irregular configuration or varying cross-sections, and by a single passage through the machine.

It has been the practice for many years in the manufacture of skis to profile the upper surface of ski blanks by a single operation in such manner that the two end portions of the ski will be much thinner than the central portion for giving the ski the desired flexibility, and further, and by a separate and distinct operation properly trim the lateral edges of said skis to finish said edges and shape the toe and heel portions thereof.

Also it has been attempted in order to speed up manufacturing operations to simultaneously profile a number of ski blanks, but this without any material success, in so far as speed of operation is concerned, in that if such practice is successful to any degree, there is still the necessity of passing said ski blanks through the machine a number of times to complete and finish the profiling operation.

It is accordingly the principal object of my invention to provide a woodworking machine so equipped for profiling and edge trimming and forming, that by passage of the ski blanks, one at a time, through the machine, said machine will automatically and completely shape a previously unshaped blank to the desired irregular configuration in a single passage through the machine, producing a smooth finished surface by a single operation and eliminating to a considerable degree resurfacing of the skis.

Another and important object of the invention is to provide for retrimming of any skis which have become warped or distorted due to the steaming, bending and drying operations, and furthermore, and should this occur, to provide for effectively supporting and holding the bent skis in proper position during their passage through the machine for the retrimming operation.

A further object of the invention is the provision of a machine for producing a ski with a ridge top, including means whereby the ridge top may be formed upon the skis either before or after the ski blanks are bent into their final shape.

It is a further object of my invention to provide a woodworking machine having one or more coacting pairs of rotating cutters so arranged that each pair acts simultaneously on a different surface of the ski blank along its edges, and this in combination with a profiling cutter, to thus provide for completely shaping the ski during its single passage through the machine, including means for yieldingly but positively urging all of said cutters in a direction toward the ski blanks and means for guiding said cutters during their shaping operation.

Another object of the invention is to so position the oppositely disposed side edge cutters with respect to each other that they coact with the toe portion of the ski-blank in succession to thereby produce a pointed toe in accordance with the shape or configuration of the ski-form.

Other objects and advantages of this invention will appear in connection with the detailed description and in the embodiments illustrated in the drawings and the novel features thereof will be particularly pointed out in the appended claims.

The woodworking machine which is the subject of this invention includes power driven feed rolls and horizontal and vertical rotating cutters having guide wheels rolling on cam tracks or templates mounted on blank bearing forms which pass under the influence of all of said cutters to emerge a completely finished and shaped article.

Figure 1:
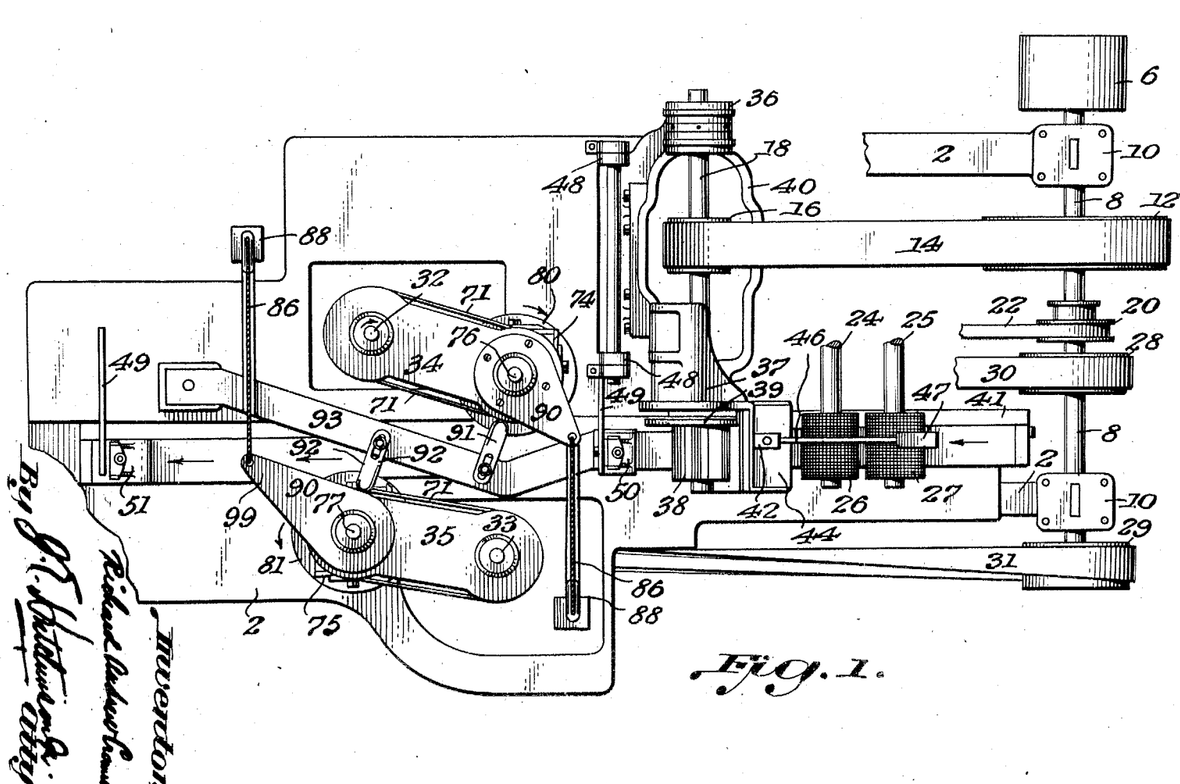
Fig. 1 is a plan view of one embodiment of a wood shaping machine constructed in accordance with this invention.
Figure 2:
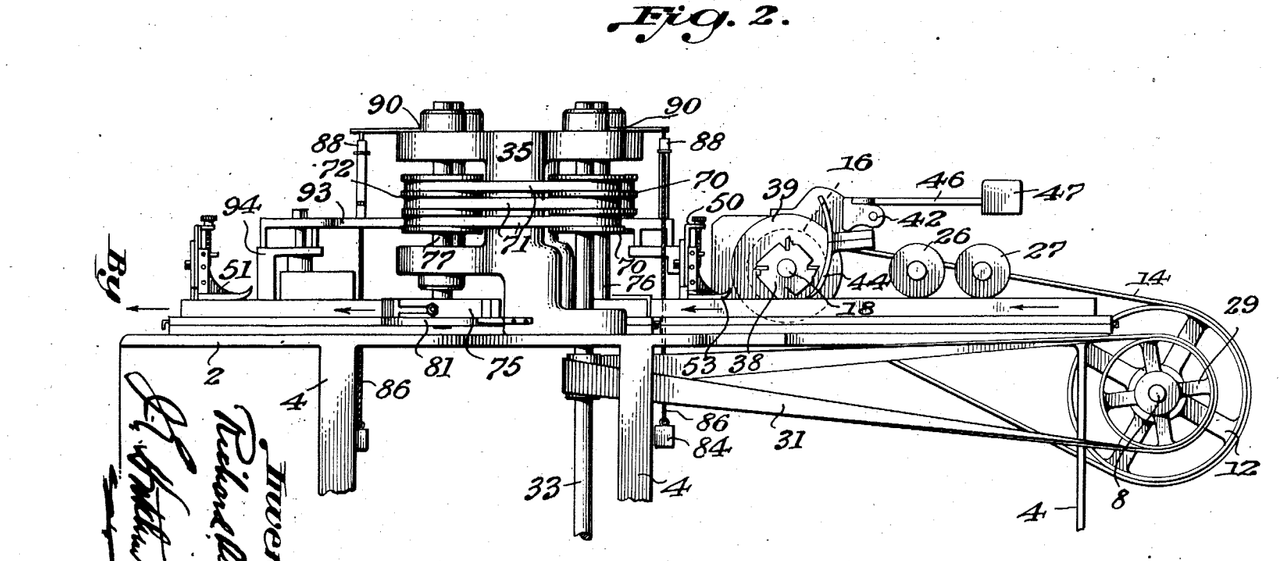
Fig. 2 is a side elevation of the machine of Fig. 1.

Referring now to Figs. 1 and 2, it will be seen that numeral 2 designates the main frame or bed of the wood shaping machine having supporting legs 4. Receiving power from any suitable source by belt drive is pulley wheel 6 mounted on shaft 8 which in turn is mounted in antifriction bearings 10 on frame 2. Also mounted on shaft 8 are pulley wheel 12 connected by belt 14 to pulley wheel 16 on horizontal shaft 18 upon which is mounted a horizontal profiling cutter head 38 pulley wheel 20 connected by belt 22 to horizontal shafts 24 and 25 on which are mounted corrugated feed rolls 26 and 27; and pulley wheels 28 and 29 connected by belts 30 and 31 to vertical shafts 32 and 33 which pivotally support side cutter head assembly frames 34 and 35, respectively, and constitute the drive shafts for the side cutter heads, all of which will presently be described more in detail.

With the present objects of the invention in mind, provision is made for properly presenting a ski-blank to all of the cutters just referred to, namely to the profiling cutter for its operation and also to the side cutter heads for trimming and shaping the side edges of the ski blank and properly shaping the toe and heel portions thereof. In this connection, blank or stock holding forms are provided, which are passed one by one through the machine by suitable feeding mechanism and along a path below the profiling cutter and between the oppositely disposed side cutter heads, whereby a ski blank mounted upon one of said forms is properly profiled upon its upper surface and also its sides are suitably shaped in accordance with the configuration of said form, and this with a single passage of the ski-blank through the machine.

These ski-forms are indicated in detail in Figures 3 to 6 of the drawings, and comprise a base member 97 having permanently mounted thereon or otherwise secured thereto, a cam track 41 along one side of said base member for controlling the operation of the profile cutter, and also a form member 96 permanently or otherwise secured to said base, the side edges of which serve to control the operation of the side cutter heads in the trimming and shaping of the side edges of the ski blank.

Now referring particularly to the profile cutter 38 (shown in Figs. 1 and 2), it is to be noted that said cutter is mounted upon shaft 18, which shaft in turn is mounted in anti-friction bearings 36 and 37. Also mounted upon said shaft 18 is guide wheel 39 which is adapted to ride upon cam track 41 on the ski form, during the passage of the form through the machine, and to thereby control the up and down movement of the profile cutter in the profiling operation. Furthermore, shaft 18 and its bearings 36 and 37 are carried by a yoke arbor 40 which is hingedly connected to frame 2 of the machine by means of a hinge assembly 48 which permits a floating cutter action by the profile cutter head 38 as guide wheel 39 rides along the cam track 41 as just set forth.

Also mounted upon said yoke arbor 40 is an arcuate shaped chip-breaker 44 urged toward the bed of the machine frame by a weight 47 secured to arm 46 extending from the yoke arbor, said chip-breaker bearing upon the ski blank at a point adjacent the profile cutter as the ski blank is fed through the machine, and this for obvious purposes.

The side cutter head assemblies 34 and 35 are journaled on the shafts 32 and 33 respectively in any conventional manner for pivotal movement about said shafts. As has been stated the side cutter heads are provided for trimming and shaping the side edges of the ski-blank including the toe and heel portions thereof, and as seen in Figs. 1 and 2, the shafts 32 and 33 of the side cutter head assemblies 34 and 35 have mounted thereon a group of pulleys 70 from which the drive is transmitted by V-belts 71 to pulley group 72 and side cutter heads 74 and 75 mounted on shafts 76 and 77. Also mounted on these cutter shafts 76 and 77 in face to face contact with the cutter heads are guide wheels 80 and 81 respectively which are yieldingly urged against the lateral edges of the ski forms by means of weights 84. These weights are connected by ropes or chains 86 over pulley members 88 to plate members 90 which are rigidly secured to the cutter head assembly frames 34 and 35.

Figure 11:
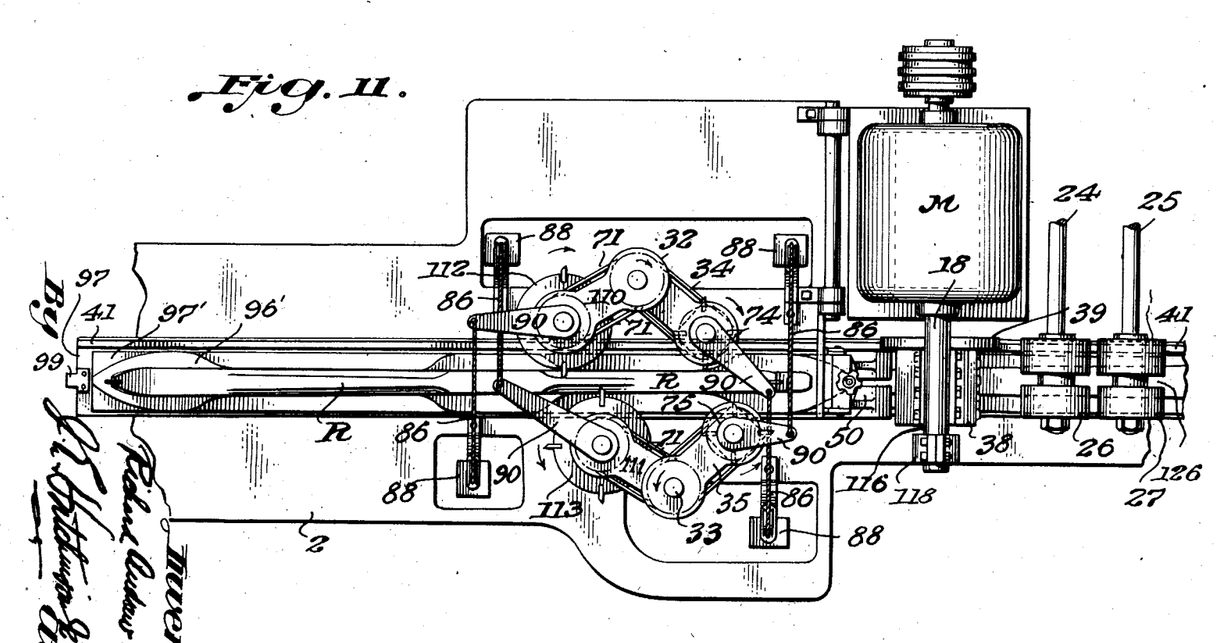
Fig. 11 is a plan view of another embodiment of the wood shaping machine of this invention which includes a blank grooving or gouging cutter for producing a ridge top upon the skis.

It is desired at this point to state that the side cutter heads cut with the feed of the ski blank through the machine (and not against the feed), or in other words, in a clockwise direction of rotation for the cutter on the righthand side of the machine and in a counterclockise direction of rotation for the cutter on the lefthand side of the machine, as viewed in Figs. 1 and 11. This rotation of the side cutter heads is necessary to prevent tearing of the stock or blank during formation of the toe portion of the ski blank as in the event the cutters revolved in the opposite direction they would be cutting against the grain, and with obvious results.

Again, it will be observed that the side cutter heads for shaping or trimming the lateral edges of the ski-blank, are mounted on the frame one ahead of the other, so that the cutter-head on the righthand side of the machine (as viewed in Figs. 1 and 11) engages the ski-blank (or stock) before the cutter-head on the lefthand side of the machine, engages said ski-blank (or stock), and this for the purpose of producing in an effective manner a pointed or other conventional type of toe portion upon the ski-blank, and in accordance with the setting of certain adjustable stops, hereafter to be described more in detail, which stops limit the inward throw of each side cutter-head. It will readily be seen that if the side cutters were arranged directly opposite one another then it would be impossible to point the toe portion of said ski, as in this case, the cutters would interfere one with the other as will be obvious.

In connection with the adjustable stops just referred to, it may be stated that pivotal motion of the side cutter head assembly frames about shafts 32 and 33 in a direction toward each other and the ski blank, is limited by adjustable stop members 91 and 92 which are mounted on a casting 93 which is suitably bolted or otherwise secured to the machine frame 2, as seen particularly in Figs. 1 and 2 of the drawings. The adjustable stops and their supporting casting are not shown in Fig. 11 so as to more clearly illustrate other features of the machine, including the gouging cutters, to be more fully described hereinafter.

Mounted on frame 2 by arms 49 before and behind the side cutter head assembly frames 34 and 35 are constant pressure members 50 and 51 which rest on the upper surface of the ski blank as it travels through the machine in the direction indicated by the arrow as shown particularly in Figs. 1 and 2 of the drawings. As will be obvious, these constant pressure members prevent the wood ski blanks from being "picked up" by the rotating cutters, and in this connection each pressure member comprises a shoe portion 53 slidably mounted for vertical adjustment in slots or grooves 54 on a frame member 55 which is fixed to the arm 49 by bolt and nut connection 67, 68. The arm 49 has a transverse slot 69 therein and the bolt connecting means 67, 68 projects through this slot and allows the frame member 55 to be adjusted transversely relative to the arm 49. Furthermore, the frame member 55 has a flange 64 through which a bolt 58 loosely extends, and this bolt is connected to the shoe member 53 by a flange member 62 rigidly connected to said shoe member 53, which flange member 62 has a threaded opening for receiving the lower threaded end of said bolt 58. Extending between the stationary flange 64, and the flange 62 on the vertically movable shoe 53, and surrounding the bolt 58, is a spring 65 which exerts downward pressure upon the flange 62, whereby the shoe member 53, which is connected to said flange 62, is yieldingly urged in a direction to exert the necessary pressure upon the ski blanks as they pass through the machine. The bolt 58 is provided with a handle 59 for turning the same so that the shoe member 53 can be raised or lowered relative to the member 55, and thus to adjust the degree of pressure necessary to be exerted on the ski blanks passing under said shoe 53 during the shaping operation. From this construction it should be clearly seen that as the shoe member 53 rides the irregular contour of the ski blanks, there will be a constant and yielding pressure exerted by the shoe member 53, due to the spring action and relation of parts just described.

Figure 3:
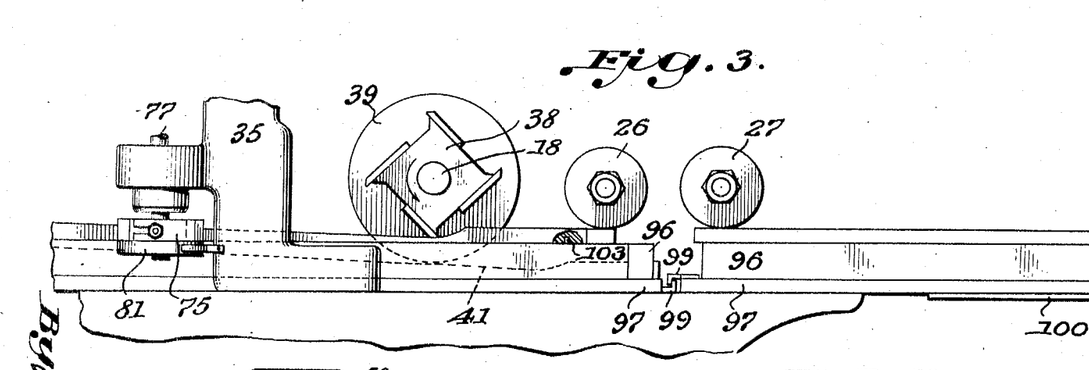
Fig. 3 is a side elevation view of a wood blank bearing ski form passing under the horizontal cutter and between the vertical cutters and illustrating the method of connecting succeeding ski forms for continuous operation.
Figure 4:
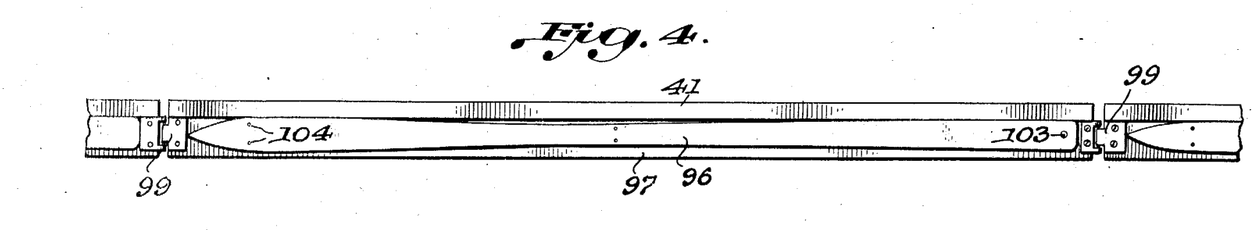
Fig. 4 is a plan view of three hingedly connected ski forms.
Figure 5:
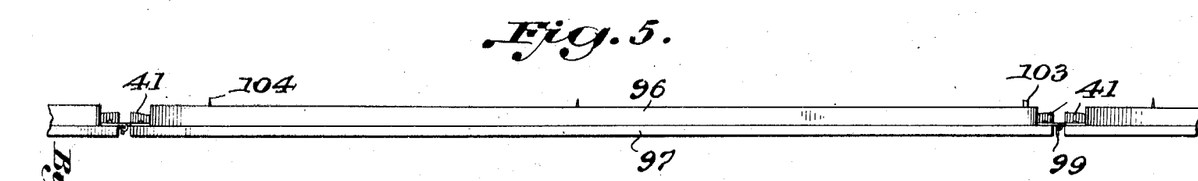
Fig. 5 is a side elevation view of the ski forms of Fig. 4.
Figure 6:
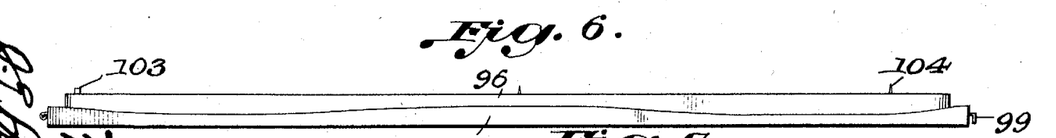
Fig. 6 is a side elevation view of one of the ski forms of Figs. 4 and 5 showing the horizontal cutters cam track mounted thereon.
Figure 7:
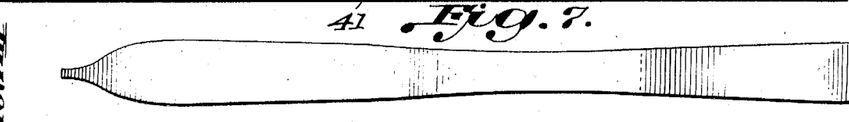
Fig. 7 is a plan view of a ski blank after having been profiled and trimmed but before being steamed and bent.
Figure 8:
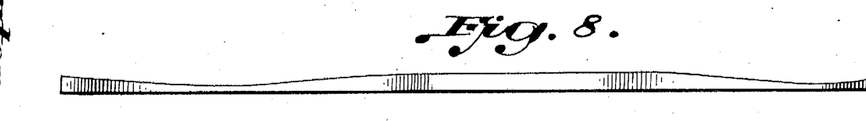
Fig. 8 is a side elevation view of the ski blank of Fig. 7.
Figure 9:
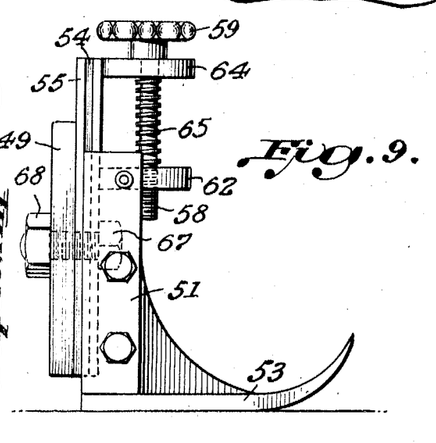
Fig. 9 is a side elevation of the details of the constant pressure shoe used in the machine to maintain the ski form and blank firmly but yieldingly against the machine bed during its travel past the rotating cutters.
Figure 10:
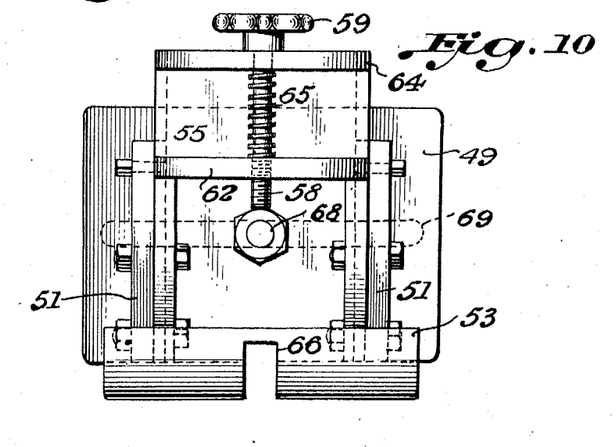
Fig. 10 is an end elevation view of the constant pressure shoe of Fig. 9.

With the type of machine here disclosed, it is highly advisable for obtaining the best results in the shaping of ski blanks, to have at least two blank holding and guiding forms fed through the machine at the same time, one after the other, and hooked or detachably connected together, end to end; and this when considering the position of the feed rolls with relation to the side cutter heads. Remembering that the side cutter heads are rotating in a direction with the feed, it can be readily seen that if only one of the forms, and its ski blank supported thereon, is passed through the machine alone, and not in this end to end connected relation with another form, then when this single form leaves the feed rolls (as the first form is about to do as viewed in Fig. 3 of the drawings) then the side cutters would have a tendency to "pick up" the ski-blank, and thereby prevent effective and accurate shaping of the side edges of said ski-blank, there being at that time only the pressure shoes in contact with the blank. However, when at least two blanks are passed through the machine in this connected relation, it will be noted that the second form, as viewed in Fig. 3 comes under the influence of the feed rolls just before the first form leaves said feed rolls, thereby permitting proper feed of both forms through the machine, the first form being pushed by the second form during the latter portion of its feed through the machine, and thus properly presented to the side cutter heads and prevented from being "picked up" thereby. In this connection, the base member 97 of each form is equipped at each end with interlocking members 99 so that the forms may be detachably connected together, end to end, for passage through the machine in this connected relation. As seen in Fig. 3, feed roll 26 is just releasing one ski blank while feed roll 27 is commencing to feed the directly following and connected form and its blank, from an extension table 100, through the machine.

In dealing with certain woods in the manufacture of skis, there is a certain percentage of warping or distorting of the skis brought about due to the steaming, bending and drying thereof, and therefore provision has been made in connection with this present machine for retrimming the side edges of the ski-blank after it has been profiled, its side edges partially trimmed, and subjected to the steaming and bending operation. Therefore, allowance is made for this extra or retrimming operation of the side edges of a bent ski blank (particularly in connection with the ski-blanks which have become so warped), by slightly increasing the diameters of guide wheels 80 and 81 so that the side cutter heads cannot make a full or complete cut along the lateral edges of the blank upon its first passage through the machine, thus leaving enough stock along these lateral edges, so that upon a second passage of the ski-blank through the machine, and with guide wheels of proper diameter; a finishing cut can then be made for straightening and properly shaping the ski blank in the event said blank has become warped during the steaming, bending and drying process.

Another and important feature of this machine, is the forming of a ridge top for the ski as indicated at R (see Figs. 11, 20, 22, 23 and 24) and this for the purpose of making the ski-blank more flexible. In this connection, side grooving or gouging cutters are provided for gouging out certain portions of the top edge of the ski-blank at each side thereof, namely, at the thinner portions of the ski-blank, or in other words, at each side top edge on opposite sides of the thickest or middle portion of the ski blank.

Referring to Fig. 11, it will be seen that shafts 32 and 33 which support and drive the side cutter head assemblies 34 and 35 also drive and support side grooving or gouging cutter head assemblies 110 and 111, which are urged toward the ski-blanks by weighted chains or ropes 86 in a similar manner as before described in connection with side cutter heads 74 and 75. These side grooving or gouging assemblies include gouging cutter heads 112 and 113 and also guide wheels 114 and 115, each cutter head and its guide wheel being mounted upon a vertical shaft and with the guide wheel directly below its associated cutter, as shown for instance in connection with cutter head 113 and its guide wheel 115 illustrated in Fig. 12 of the drawings, it being noted that cutter head 112 and its guide wheel 114 do not appear in said Fig. 12 as they are located on the opposite side of the machine and out of sight. Furthermore, there is a similar V-belt drive for these cutters between the pulleys on the drive shafts 32 and 33 and a pulley group mounted on the gouging cutter shafts, as will be clearly seen on reference to Figs. 11 and 12.

Figure 12:
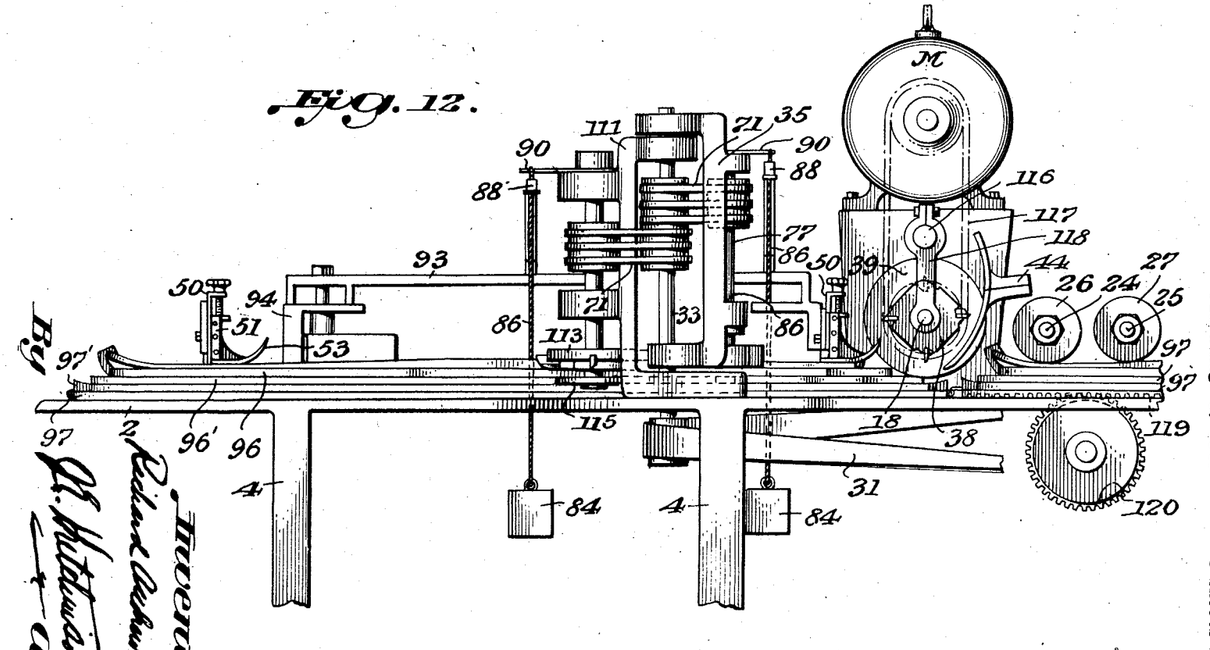
Fig. 12 is a side elevation of the machine of Fig. 11.

In the embodiment of the invention shown in Figs. 11 and 12, power for driving all of the side shaping cutters and the feed rolls is furnished by belts as before set forth in connection with Figs. 1 and 2, while on the other hand the horizontal or profile cutter head receives power by belt 117 from motor M, as shown in dotted lines in Fig. 12. By mounting motor M hingedly to frame 2, and rigidly supporting the profile cutter shaft upon the motor frame, there is no necessity for providing special means for urging the profile cutter 38 to the work as permitted by guide wheel 39 on cam track 41, as the weight of the motor and its frame is sufficient for this purpose. In this connection, profile cutter shaft 18 is rigidly supported at the cutter end by means of horizontal bar 116 which is mounted in the motor support or frame, having depending therefrom a slidable support 118, through which the outer end of shaft 18 extends for properly positioning and supporting the profile cutter in driving relation with the motor.

It is of course to be understood that in the manufacture of skis embodying ridge tops, the blank holding and guiding forms are so designed that in addition to the guiding surfaces for controlling the profile cutter and also the side cutter heads, suitably shaped kick-out cam surfaces are provided on the forms for controlling the operation of the gouging cutters. These special forms are shown particularly in Figs. 13 to 19 of the drawings and comprise a lower base member 97 upon which cam track 41 is mounted at one side thereof, in a manner as heretofore described. Superposed upon the lower base member 97 is an upper base member 97', and mounted upon said base member 97' is ski form 96' against the side edges of which guide wheels 114 and 115 of gouging cutters 112 and 113 bear to properly control these particular cutters in the forming of the ridge top to which reference has heretofore been made. Also superposed on gouging cutter form 96' is form 96 against the side edges of which bear guide wheels 80 and 81 of side trimming cutter heads 74 and 75. Therefore it will be seen that in this particular type of form there are provided guiding surfaces for controlling all of the cutters herein disclosed during the passage of a ski blank through the machine, and in this connection it is to be noted that by the use of such a holding and guiding form it will be possible to profile the upper surface of ski blanks, trim the side edges thereof, and also form the ridge top, and this by a single passage of the blank through the machine, if this is desired. However, and due to the fact that in some instances the skis become warped or distorted after being put through the steaming, bending and drying process, it may become more practical to have the blank or stock put through the machine a second time as herein set forth.

In connection with the retrimming operation, that is to say, the retrimming of the side edges of the ski blanks after the same have been steamed and bent, provision is made upon the ski forms just referred to, and as shown in Figs. 13 to 16, to properly position and hold down the bent ski blank upon the holding and guiding form, maintaining said blank in a comparatively flattened condition during its passage through the machine. In this connection it will be noted that hold-down hooks or latch members 122 and 123 are provided for engaging the toe and heel portions of the ski blank, and thus serving to retain the blanks in the desired flattened condition upon the forms so that said blanks may be properly presented to the cutters for the retrimming operation.

Figures 13, 14:
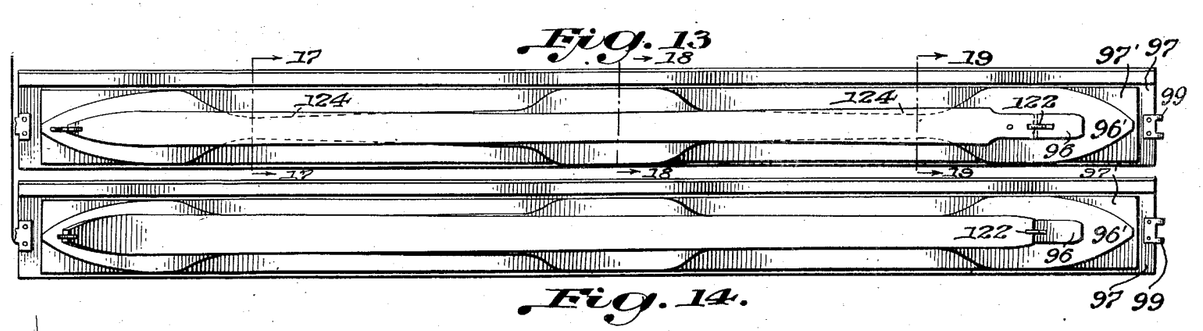
Fig. 13 is a plan view of the ski forms mounted on the base members.
Fig. 14 is a plan view of the ski form of Fig. 13 having a profiled and side trimmed ski blank mounted thereon after the ski blank has been steamed and bent.

Referring again to the formation of the ridge top upon the skis, it is desired to call attention to the fact that the side edges of form 96' are suitably tapered toward its ends at that portion thereof near its ends and opposite the thinner portions of the ski-blank, supported thereon, and this as indicated at 124 in dotted lines in Fig. 13. In this connection it will be observed that the ski-blank after being profiled tapers toward each end, as viewed in side elevation in Fig. 15 of the drawings, and therefore provision must be made for allowing the gouging cutters to be urged further inward toward the ski-blank at the thinner portions of said blanks, and this in order to allow for the making of gouging cuts which will form a ridge upon the ski-blank of substantially uniform width as viewed in Fig. 20 of the drawings. In other words, the gouging cutters when operating upon the ski-blank nearest its ends (the thinner portion of the tapering blank) will be allowed to project further inward, and in fact beyond the longitudinal center line of the ski-blank, so that only the heel of the cutters will function to cut away only that portion of the top edge of the blank to maintain this uniform thickness of ridge top, and of course this varying inward movement of the cutters is controlled by the tapered or angular guiding surface 124 upon form 96' as herein stated.

With reference to Figs. 12, 16, 17 and 25 of the drawings, it will be noted that provision is made for a positive feed of the ski form through the machine, wherein rack 119 is secured to a lateral edge of ski form base member 97, and a driving pinion 120, which in turn is driven from any suitable gearing from the shaft 25, is mounted to mesh with said rack for the purposes intended. This arrangement provides a steady and positive feed for the ski forms, and is particularly desirable when feeding a ski-blank through the machine in its bent formation, as the feed rolls are of course at that time not as effective as when operating upon a blank before the profiling and bending operation. When two or more of the ski forms are connected together end to end for passage through the machine as heretofore described, the ends of the racks 119 mounted thereon will of course be in abutting relation, thereby constituting a continuous rack for engagement with the driving pinion and providing for proper feed of the forms as will be obvious.

Figure 15:
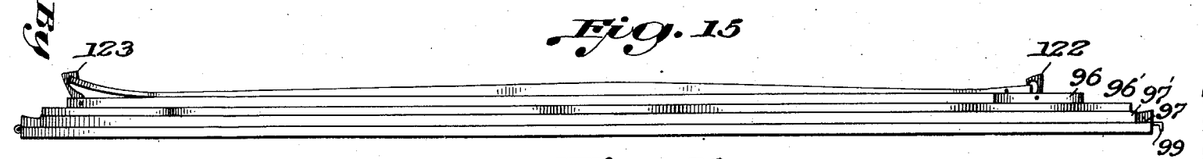
Fig. 15 is a side elevation view of the ski form and blank of Fig. 14.
Figure 16:
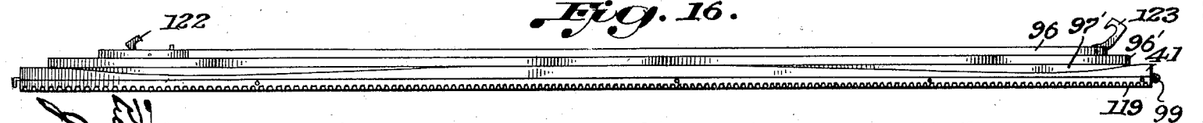
Fig. 16 is a side elevation view of the ski form of Fig. 15 without a blank thereon and looking from the opposite side showing the gear rack and cam track mounted thereon.
Figure 17:
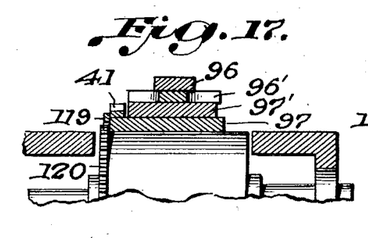
Fig. 17 is a cross sectional view on the line 17—17 of Fig. 13.
Figure 18:
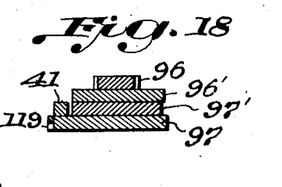
Fig. 18 is a cross-sectional view on the line 18—18 of Fig. 13.
Figure 19:
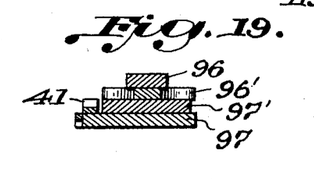
Fig. 19 is a cross-sectional view on the line 19—19 of Fig. 13.
Figure 20:
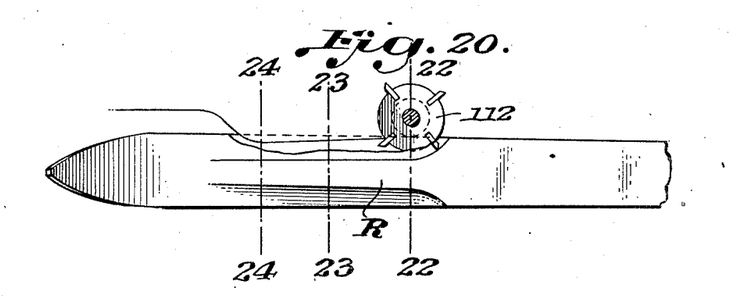
Fig. 20 is a plan view of the grooving or gouging cutter finishing one of its cuts on the ski blank for forming the ridge top.
Figure 21:
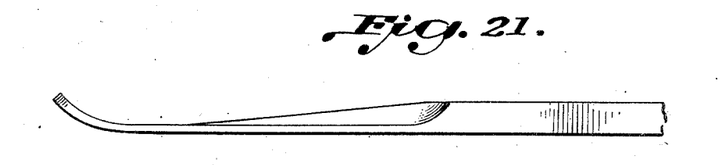
Fig. 21 is a side elevation of the ski blank of Fig. 20.
Figures 22, 23, 24, 25, 26:
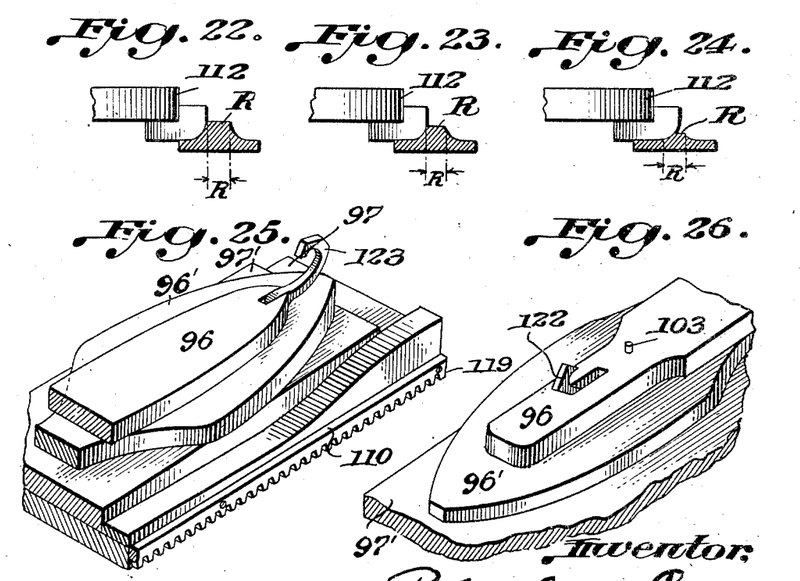
Fig. 22 is a cross-sectional view on the line 22—22 of Fig. 20 showing the action of the grooving or gouging cutter.
Fig. 23 is a cross-sectional view on the line 23—23 of Fig. 20.
Fig. 24 is a sectional view on the line 24—24 of Fig. 20.
Fig. 25 is a perspective view of the details of the toe end of a ski form.
Fig. 26 is a perspective view of the details of the heel end of a ski form.

As will be seen in Figs. 15 and 16, the holddown hooks or latch members 122 and 123 project slightly above the forms for the purposes intended, and in order to prevent any interference of these hooks with the feed rolls 26 and 27, and permit said hooks to pass freely under the feed rolls, said feed rolls are circumferentially grooved or recessed as at 126, as shown in Fig. 11 of the drawings. For this same reason, the pressure shoes are formed with open slot 66 through which the hook members 122 and 123 may freely pass.

Also as viewed particularly in Figs. 3, 5, 6 and 26, the rear end of each form is provided with an upwardly projecting stud 103, which is adapted to engage a suitably formed depression on the under surface of the heel portion of the skiblank, and this for the purpose of properly positioning the blank upon its holding form, and maintaining and holding said blank in a steady relation with its form during passage of the form and blank through the machine. On leaving the machine, the completely shaped ski has an inch or so of stock trimmed from the heel end thereof so as to remove the depression by which stud 103 secured the blank to the form. Suitable prongs 104 may also be provided on the form for piercing the under surface of the skiblanks in holding the blank in position, but these prongs are not at all necessary, and can be dispensed with, as it has been found that at times the undersurface of the skis is somewhat marred.

What I claim and desire to secure by Letters Patent is:

1. A ski cutting machine comprising a frame, a vertically movable profile cutter mounted on said frame, oppositely positioned side cutter heads also mounted upon said frame, a removable ski holding and guiding form movable longitudinally upon the frame below the profiling cutter and between the side cutter heads for presenting a ski blank to said cutters and controlling the shaping operation, said ski form with its ski blank carried thereby adapted to be passed into, through and out of the machine during each shaping operation, a guide associated with each of said cutters and adapted to engage the ski form during its travel through the machine to force the cutters to make an article of the desired shape, means for holding and properly positioning a ski blank upon said form, and mechanism for feeding said blank and its form through the machine, whereby the ski blank is profiled and its side edges shaped in accordance with the configuration of said form during a single passage of the ski blank through the machine.

2. A ski cutting machine comprising a frame, a cutter mounted on said frame, a pair of removable blank holding forms detachably connected together for travel through the machine at the same time one after the other and for presentation to the cutter for shaping purposes, means for holding and properly positioning a ski blank upon each of said forms, a template or cam track carried by each form for controlling the cutter to properly shape the ski blanks as the forms and blanks pass the cutter, and feed rolls directly engaging the blanks for feeding said blanks and holding forms through the machine to present said blanks to the cutter, each holding form due to its connected relation with the other form serving to control the positive feed of the other form for at least a portion of its travel through the machine when either form is under the influence of the feed rolls.

3. A ski cutting machine comprising a frame, a vertically movable profile cutter mounted on said frame, a pair of removable blank holding forms arranged for travel through the machine at the same time one after the other and below the cutter, means for holding and properly positioning a ski blank upon each of said forms, feed rolls directly engaging the blanks for feeding said blanks and holding forms through the machine, and a template or cam track carried by each form for raising and lowering the cutter to profile the upper surface of the ski blanks, said holding forms being detachably connected together end to end for simultaneous movement and with the feed of each form effecting a positive feed of the other form for at least a portion of the passage of each form through the machine, whereby said blanks and forms are maintained under the influence of the feeding action during the entire profiling or cutting operation upon each ski blank, and proper presentation of both ski blanks to the cutter is accomplished.

4. A ski cutting machine comprising a frame, cutter heads mounted on said frame, a pair of removable blank holding and guiding forms arranged to travel through the machine at the same time one after the other to present the ski blanks carried by said forms to said cutters for shaping purposes, means for holding and properly positioning a ski blank upon each of said forms, a rack bar carried by each form, and a drive pinion adapted to cooperate with both of said racks to positively feed the forms and ski blanks carried thereby through the machine, said holding forms being detachably connected together end to end for proper movement through the machine and the racks on said forms when the forms are properly connected together constituting a continuous rack for engagement with the drive pinion, whereby uninterrupted and uniform feed of at least two ski blanks through the machine may be accomplished without further manual handling.

5. A ski cutting machine comprising a frame, a removable blank holding and guiding form arranged for travel through the machine, means for holding and properly positioning a ski blank upon said form, including holddown hook members at each end of the form for detachably engaging the ski blank at its opposite ends after the same has been steamed and bent to position any turned up end in depressed relation to said form, oppositely disposed side cutter heads mounted upon said frame, and means urging the cutter heads into contact with the bent ski blank as said form and ski blank travel through the machine between said cutters for retrimming the ski after the steaming and bending operation, whereby said form and its blank may pass freely through the machine during the retrimming operation.

6. A ski cutting machine comprising a frame, a removable blank holding and guiding form arranged for travel through the machine, means for holding and properly positioning a ski blank upon said form, including hold-down hook members at each end of the form for detachably engaging the ski blank in its final bent formation, feed rolls directly engaging the upper surface of the ski blank for feeding said blank and holding form through the machine, said feed rolls provided with a circumferential recess intermediate their width to permit the hold-down hook members to pass the feed rolls during the feeding of the ski blank and form through the machine, and oppositely disposed side cutter heads mounted upon said frame for engaging the edges of the bent ski blank during the retrimming operation, said cutters being guided in their operation in accordance with the configuration of said holding and guiding form.

7. A ski cutting machine comprising a frame, pivotally mounted side cutter heads on said frame and arranged one in advance of the other for independent movement transversely of the machine frame, a removable blank holding and guiding form arranged for travel through the machine and between said cutter heads to present a ski blank to said cutter heads for performing the shaping operation, means for urging said cutter heads in a direction toward said ski form, guiding means carried by each cutter head and adapted to engage the ski form to limit inward movement of the cutter heads to thereby control the trimming and shaping of the ski blank in accordance with the configuration of said form, and adjustable stops cooperating with said cutter heads to control the inward movement of said cutter heads while operating on the toe portion of the ski blank to thereby shape said toe portion to the desired configuration according to the adjusted positions of said stops, whereby said cutter heads are so mounted and controlled for movement one at a time across the path of travel of said ski blank to successively operate upon said blank in the forming of the toe portion of the blank.

8. The invention set forth in claim 7 in which said adjustable stops are mounted upon a support secured to the machine frame positioned between the oppositely disposed cutter heads and above the travel of the ski blank form through the machine.

9. A ski cutting machine comprising a frame, a removable ski holding and guiding form movable longitudinally upon said frame into and out of the machine, a plurality of spaced kick-out cam members along the side edges of said form, means for holding and properly positioning a ski blank upon said form, profile and side cutter heads mounted on said frame for shaping a ski blank, in combination with a gouging cutter head mounted upon said frame on each side of the travel of said ski form through the machine and adapted under the control of the kick-out cam members to make gouging cuts at spaced intervals in the top side edges of the ski blank for forming a ridge top of the desired type upon said ski blank, said kick-out cam members serving to move the gouging cutters to inactive positions at certain periods during the travel of the ski form and its blank through the machine, means for urging said cutter heads in a direction toward said ski form for performing the shaping and gouging operations, and means associated with each cutter head and adapted to engage the ski form and its spaced cam members to limit the inward movement of the cutter heads and thereby control the shape of said ski blank and its top side edges in the forming of a ski blank with a ridge top at different points along the blank.

10. The invention set forth in claim 9 in which the gouging cutter heads are so controlled as to form a ridge top of uniform width upon the top surface of the ski blank.

11. A ski cutting machine comprising a frame, cutter heads mounted on said frame, a pair of removable blank holding and guiding forms arranged to travel through the machine at the same time one after the other in connected relation to present the ski blanks carried by said forms to said cutters for shaping purposes, means for detachably connecting said forms together in end to end relation in their travel through the machine, and positive feed means cooperating with the forms and the ski blanks carried thereby for feeding said forms and ski blanks through the machine, whereby either one or the other of said ski blank forms in this connected relation is always under the influence of the feed means so that positive feed and proper presentation of the ski blanks to the shaping cutters may be had regardless of whether the feed means is in cooperative relationship with only one or the other of said connected ski blank forms.

12. A ski cutting machine comprising a frame, a vertically movable profile cutter mounted on said frame, oppositely disposed side cutter heads also mounted on said frame, oppositely disposed gouging cutter heads mounted upon the frame, a removable ski holding and guiding form movable longitudinally upon the frame below the profiling cutter and between the oppositely disposed side cutter heads and gouging cutter heads for presenting a ski blank to said cutter heads and controlling the shaping operation, said ski form with its ski blank carried thereby adapted to be passed into, through and out of the machine during each shaping operation, a guide associated with each of said cutters and adapted to engage the ski form during its travel through the machine to force the cutters to make an article of the desired shape, means for holding and properly positioning a ski blank upon said form for its shaping operation, and mechanism for feeding said blank and its form through the machine, whereby the ski blank is profiled, its side edges trimmed, and gouging cuts made for forming a ridge top, all in accordance with the configuration of said form, and with a single passage of a ski blank through the machine.

13. A ski cutting machine comprising a frame, a removable ski holding and guiding form movable longitudinally upon said frame into and out of the machine, means for holding and properly positioning a ski blank upon said form, a cutter for profiling the upper surface of said ski blank to provide a tapered thickness for the blank at desired points throughout its length, a gouging cutter head mounted upon said frame on each side of the travel of said ski form and its blank through the machine for making gouging cuts in the top side edges of the blank for the forming of a ridge top upon said blank, means for urging said cutter heads in a direction toward said ski form for performing the gouging operation, and tapered cutter guide means along the side edges of the ski form to control the inward movement of the gouging cutter heads to varying extent according to the tapered thickness of the ski blank and thus provide for the forming of a ridge top of uniform width.

14. A ski cutting machine comprising a frame, side cutter heads mounted on said frame and arranged one in advance of the other for independent movement transversely of the machine frame, a removable blank holding and guiding form arranged for travel through the machine and between said cutter heads to present a ski blank to said cutter heads for performing the shaping operation, means for urging said cutter heads in a direction toward said ski form, guiding means carried by each cutter head and adapted to engage the ski form to limit inward movement of the cutter heads to thereby control the trimming and shaping of the ski blank in accordance with the configuration of said form, whereby said cutter heads are so mounted and controlled for movement one at a time across the path of travel of said ski blank to successively operate upon said blank in the forming of the toe portion of the blank.

RICHARD ANDREW CROMWELL.